US012783667B2

(12) United States Patent
Venkatachalam et al.

(10) Patent No.: US 12,783,667 B2
(45) Date of Patent: Nov. 3, 2026

(54) METHODS AND SYSTEMS FOR PROTECTING SHADOW COPIES

(71) Applicant: Zoho Corporation Private Limited, Kanchipuram District (IN)

(72) Inventors: Mathivanan Venkatachalam, Chennai (IN); Rajesh Ranganathan, Kanchipuram District (IN); Vishal Santharam, Kanchipuram District (IN); Kirubagaran Thangasami, Kanchipuram District (IN)

(73) Assignee: Zoho Corporation Private Limited, Kanchipuram District (IN)

( * ) Notice: Subject to any disclaimer, the term of this patent is extended or adjusted under 35 U.S.C. 154(b) by 179 days.

(21) Appl. No.: 18/182,449

(22) Filed: Mar. 13, 2023

(65) Prior Publication Data

US 2023/0222216 A1 Jul. 13, 2023

Related U.S. Application Data

(63) Continuation of application No. 17/863,572, filed on Jul. 13, 2022.

(Continued)

(30) Foreign Application Priority Data

Sep. 16, 2021 (IN) ............................ 202141041976

(51) Int. Cl.
*G06F 21/56* (2013.01)
*G06F 21/60* (2013.01)

(52) U.S. Cl.
CPC .......... *G06F 21/566* (2013.01); *G06F 21/565* (2013.01); *G06F 21/602* (2013.01); *G06F 2221/033* (2013.01)

(58) Field of Classification Search
CPC ...... G06F 21/566; G06F 21/565; G06F 21/56; G06F 21/577; G06F 21/602; G06F 21/62;
(Continued)

(56) References Cited

U.S. PATENT DOCUMENTS 7,761,456 B1 * 7/2010 Cram .................. G06F 11/1469 707/754
8,220,053 B1 * 7/2012 Sun ....................... G06F 21/562 726/24

(Continued)

FOREIGN PATENT DOCUMENTS

CA 3025225 A1 * 5/2020 ........... G06F 16/128
WO 2021126747 6/2021

OTHER PUBLICATIONS

Ahmed, M. E., Kim, H., Camtepe, S., Nepal, S. "Peeler: Profiling Kernel-Level Events to Detect Ransomware". arXiv: 2101.12434 [cs.CR]. Jan. 29, 2021. https://doi.org/10.48550/arXiv.2101.12434 (Year: 2021).*

(Continued)

*Primary Examiner* — Tae K Kim
(74) *Attorney, Agent, or Firm* — Silicon Edge Law Group LLP; Arthur J. Behiel

(57) ABSTRACT

Described are methods and systems that prevent malicious software from deleting shadow copies of computer files that might be required to restore user data in the event of a ransomware attack. A user layer includes a volume snapshot service that makes shadow copies and includes a hook to intercept delete requests. A kernel layer includes a filter to disallow shadow-copy deletion requests directed from the user layer to the operating-system.

16 Claims, 5 Drawing Sheets

Related U.S. Application Data

(60) Provisional application No. 63/280,539, filed on Nov. 17, 2021.

(58) Field of Classification Search
CPC ............... G06F 2221/033; G06F 11/14; G06F 2201/84; G06F 11/1466; G06F 11/1448; G06F 21/60
See application file for complete search history.

(56) References Cited

U.S. PATENT DOCUMENTS

| | | | | |
|---|---|---|---|---|
| 10,229,269 | B1 * | 3/2019 | Patton | G06F 21/554 |
| 10,303,556 | B1 * | 5/2019 | Banerjee | G06F 11/1451 |
| 10,585,757 | B1 * | 3/2020 | Jagannatha | G06F 11/1451 |
| 10,606,766 | B1 * | 3/2020 | Rellinger | G06F 21/60 |
| 2009/0043968 | A1 * | 2/2009 | Vanamamalai | G06F 11/2048 711/147 |
| 2010/0031360 | A1 * | 2/2010 | Seshadri | G06F 21/74 726/28 |
| 2016/0378988 | A1 * | 12/2016 | Bhashkar | G06F 21/566 726/24 |
| 2018/0248896 | A1 * | 8/2018 | Challita | G06F 11/1451 |
| 2018/0351969 | A1 * | 12/2018 | MacLeod | G06F 11/2038 |
| 2019/0108340 | A1 * | 4/2019 | Bedhapudi | G06F 21/554 |
| 2019/0108341 | A1 * | 4/2019 | Bedhapudi | G06F 21/566 |
| 2019/0109870 | A1 * | 4/2019 | Bedhapudi | H04L 63/0428 |
| 2020/0012803 | A1 * | 1/2020 | Mannan | G06F 21/6218 |
| 2020/0026433 | A1 * | 1/2020 | Govindan | G06F 11/1466 |
| 2020/0065196 | A1 * | 2/2020 | Desai | G06F 11/1438 |
| 2020/0067975 | A1 * | 2/2020 | Ojha | G06F 21/577 |
| 2020/0117365 | A1 * | 4/2020 | Patwardhan | G06F 11/1446 |
| 2020/0210568 | A1 * | 7/2020 | Strogov | G06F 21/6218 |
| 2020/0342104 | A1 * | 10/2020 | Palisse | G06F 21/566 |
| 2021/0049078 | A1 * | 2/2021 | Khan | G06F 11/073 |
| 2021/0271758 | A1 * | 9/2021 | Bedhapudi | G06F 21/566 |
| 2021/0400060 | A1 * | 12/2021 | Chacko | H04L 63/20 |
| 2022/0027472 | A1 * | 1/2022 | Golden | G06F 21/554 |
| 2022/0292195 | A1 * | 9/2022 | Holland | G06F 21/6218 |

OTHER PUBLICATIONS

Hunter, Ben, "Stomping Shadow Copies—a Second Look Into Deletion Methods," Apr. 27, 2020; https://www.fortinet.com/blog/threat-research/stomping-shadow-copies-a-second-look-into-deletion-methods (Year: 2020).*

Examination Report from Intellectual Property of India, Indian Application No. 202141041976 filed Sep. 16, 2021, Date of Dispatch/Email Oct. 20, 2023 (7 pages).

Wikipedia, "Event (computing)," retrieved from https://en.wikipedia.org and last edited on Jul. 27, 2021, at 15:26 (UTC), 5 pages.

* cited by examiner

METHODS AND SYSTEMS FOR PROTECTING SHADOW COPIES

TECHNICAL FIELD

Embodiments of the present disclosure relate generally to data processing and, more particularly, but not by way of limitation, to methods and systems for protecting computer systems from malware (a portmanteau for malicious computer software).

BACKGROUND

"Ransomware" is a type of malware from cryptovirology that attacks a victim's computer by encrypting their files or otherwise denying file access until a ransom is paid. Ransomware attackers may also threaten to publish the victim's data unless a ransom is paid. In the computer context, a file is a virtual component stored in memory to represent e.g. an image, text, video, or a computer program. A ransomware process, an instance of a ransomware program executing on a computer, can overwrite and delete files using calls to the computer's operating system.

Anti-virus (AV) and Next-generation Anti-virus (Nextgen AV) software detect malware using techniques like signature-based detection, traffic-based detection, and behavioral detection. Signature-based detection requires malware with a known signature and is thus ineffective against recent strains or targeted attacks. Traffic-based detection looks for communication patterns common to malware to detect recent strains but is relatively slow and inefficient. Behavior-based detection evaluates a process' actions or intended actions for suspicious behavior. Though promising, behavioral detection techniques suffer from high false-positive rates and concomitant productivity loss. There is therefore a need for improved malware detection and mitigation.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
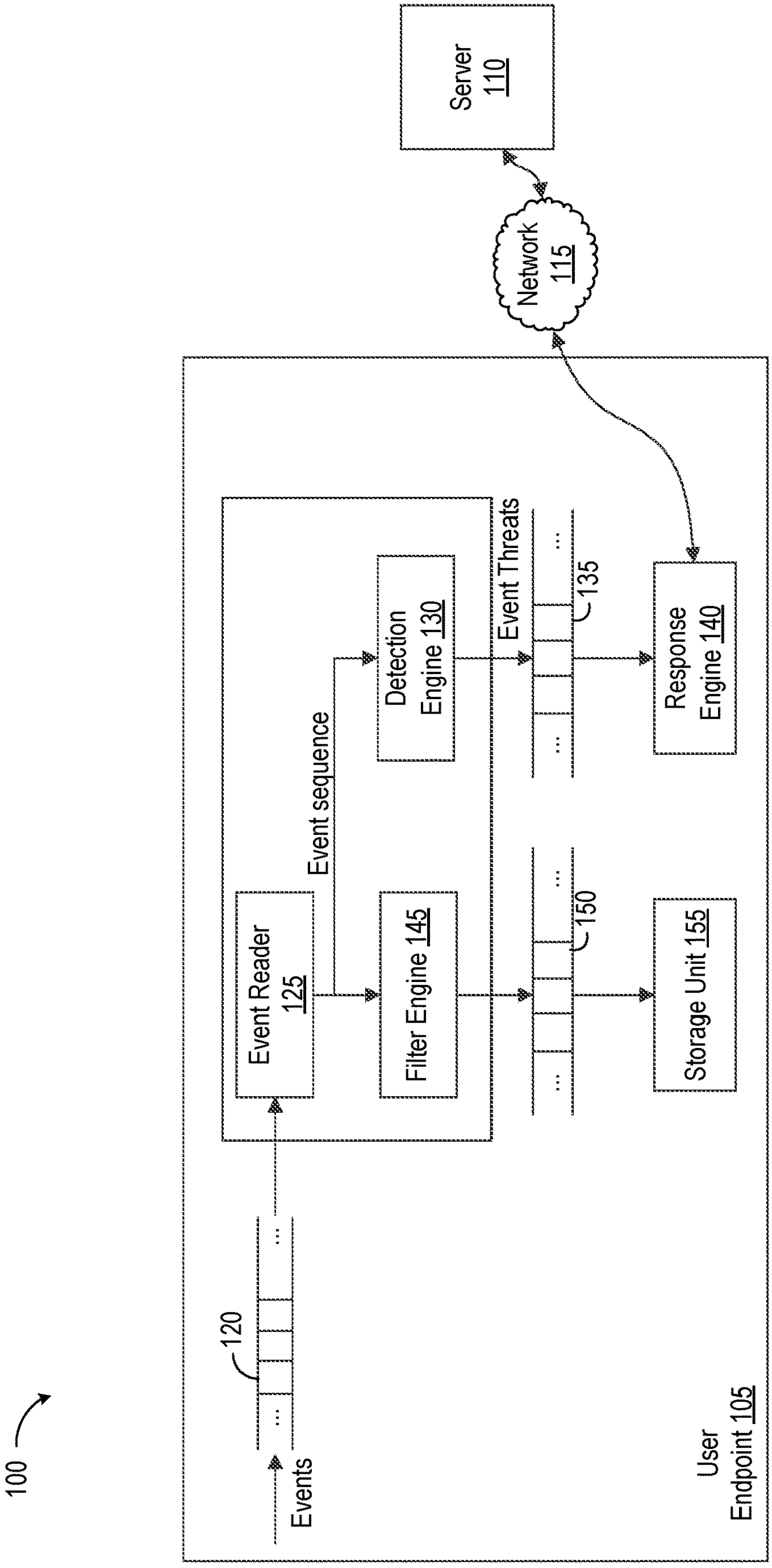
FIG. 1 depicts a malware detection system 100 in accordance with one embodiment.

FIG. 1 depicts a malware detection system 100 in accordance with one embodiment. System 100 includes a user endpoint 105 (e.g. a desktop computer, laptop, or mobile device) connected to a server 110 via a network 115 (e.g. the Internet). Endpoint 105 detects ransomware by analyzing process events (notifications related to a process start and end) and file events (notifications related to file operations, such as Read, Write, Delete, Rename, Directory create, and Directory traversed). In this context, a "process" is a single unit of execution spawned from an executable file, or "binary," and an "event" is a single unit of notification corresponding to changes made by a process.

User endpoint 105 includes a raw-data queue 120 that relays incoming events to an event reader 125 for interpretation. A detection engine 130 scans an event sequence corresponding to a given file to check if it is a ransomware threat. A high-priority queue 135 acts as a buffer to store the events deemed threatening before passing them on to a response engine 140, which performs any one of three responses as configured by the system administrator. The three responses are 1) Detect, 2) Detect and kill, and 3) Detect, kill, and back-up recovery. Response engine 140 notifies server 110 about events posing ransomware threats and about the suitable configured response performed.

Events from event reader 125 also flow through a filtering unit 145, which extracts necessary events and moves them to a low-priority queue 150 on their way to a storage unit 155 for future reference in case of any investigation. Examples of necessary events are File_Write, File_Rename, and File_Delete, which are necessary to note because they impact stored files. Unnecessary events, such as File_Read and Dir_Traversed, are filtered out to save space because they are not needed to recall changes. Server 110 may also insist on storing all the events posing ransomware threats to endpoint 105 for future investigation.

Figure 2:
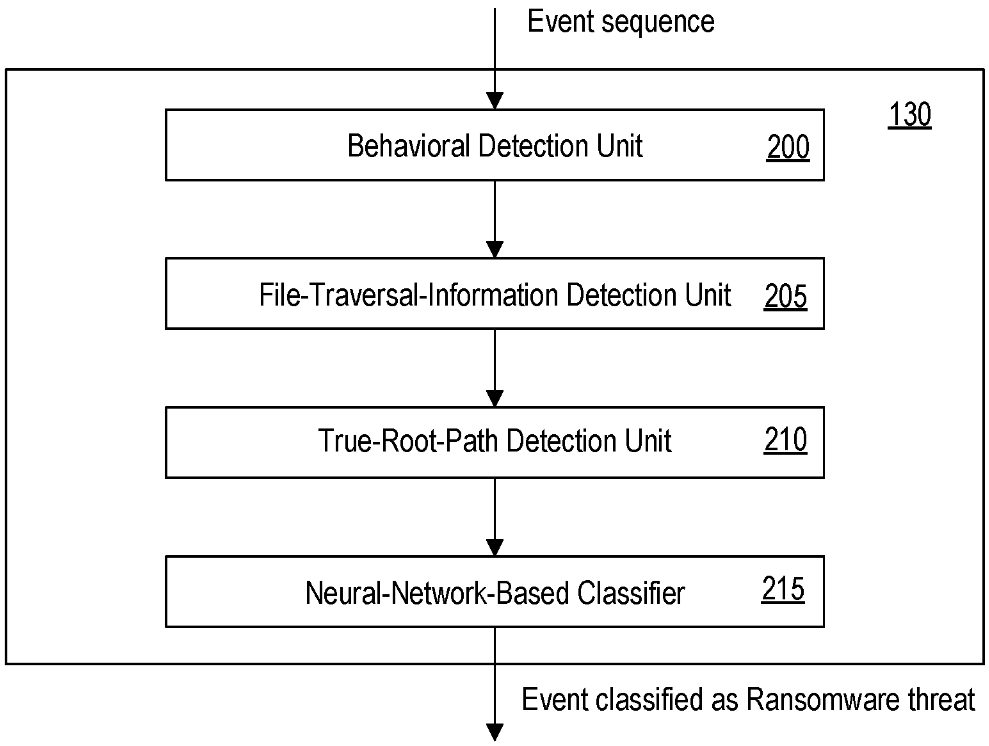
FIG. 2 depicts detection engine 130 in accordance with an embodiment that includes a behavioral detection unit 200, a file-traversal-information detection unit 205, a true-root-path detection unit 210, and a neural-network-based classifier 215.

FIG. 2 depicts detection engine 130 in accordance with an embodiment that includes a behavioral detection unit 200, a file-traversal-information detection unit 205, a true-root-path detection unit 210, and a neural-network-based classifier 215.

Behavioral detection unit 200 identifies behavioral patterns in event sequences for each process under consideration. These behavioral patterns include:

- ORIGINAL_FILE_OVERWRITE—The process continuously navigates multiple folders and overwrites files with encrypted content.
- ORIGINAL_FILE_DELETED_AND_NEW_ENCRYPTED_FILE_CREATED—The process continuously navigates multiple folders, deleting files and creating new files with encrypted content.
- ORIGINAL_FILE_OVERWRITE_AND_RENAMED—The process continuously navigates multiple folders, overwrites files with encrypted content, and renames the overwritten files.
- ORIGINAL_FILE_RENAMED_AND_OVERWRITE—The process continuously navigates multiple folders, renames the files, and overwrites the renamed files with encrypted content.

The behavioral pattern can also be one of the following based on the process and corresponding binary file:

- Single binary and Single process: A Single process will discover files and encrypt them.
- Single binary and Multiple process: Multiple processes spawned from a single binary, split the work among them and encrypt a limited set only, thereby evading frequency-based detections.
- Multiple binary and Multiple process: A binary is dedicated for each operation. Hence it is highly evasive.

Behavioral detection unit 200 passes files whose event sequences have been determined to be a ransomware threat to file-traversal-information detection unit 205, which determines the information corresponding to the file traversal pattern using Application Program Interface (API) based traversal and/or New Technology File System (NTFS) based traversal. Detection unit 205 supports an algorithm that detects path-traversal attacks, which exploit security flaws associated with user-supplied file names. Algorithms for preventing path-traversal attacks are well known so a detailed discussion is omitted.

The file traversal pattern alone may be insufficient to determine whether a file or files is affected by ransomware because a desired process may traverse files in a similar manner. If the file traversal pattern is suspect, then the process moves to true-root-path detection unit 210 for further consideration.

Files are typically organized in a file system, a data structure that the operating system uses to control how files are stored in memory. The file system separates data into files across large numbers of directories and subdirectories, "genuine" here referring to processes that are intended by the user or consistent with the user's goals. True-root-path detection unit 210 distinguishes between the file-modification patterns of ransomware and genuine processes to improve ransomware detection and reduce false positives.

Whenever a file is modified by a process, true-root-path detection unit 210 looks up the path of the folder containing the file and compares this path with those of other files modified by the same process. A popular CHROME web browser developed by Google LLC exemplifies a genuine process, the executable chrome.exe, that can modify files within many folders. The following Table 1 lists twenty-nine paths associated with an instance of process chrome.exe, each path identifying a folder that can include one or more files that can be acted upon by the process.

TABLE 1

| | List of multiple folders accessed by Chrome.exe |
|---|---|
| 1 | C:\Users\test\AppData\Local\Google\Chrome\UserData\AutofillStates |
| 2 | C:\Users\test\AppData\Local\Google\Chrome\UserData\BrowserMetrics |
| 3 | C:\Users\test\AppData\Local\Google\Chrome\UserData\CertificateRevocation |
| 4 | C:\Users\test\AppData\Local\Google\Chrome\UserData\ClientSidePhishing |
| 5 | C:\Users\test\AppData\Local\Google\Chrome\UserData\Crashpad |
| 6 | C:\Users\test\AppData\Local\Google\Chrome\UserData\CrowdDeny |
| 7 | C:\Users\test\AppData\Local\Google\Chrome\UserData\Default |
| 8 | C:\Users\test\AppData\Local\Google\Chrome\UserData\DesktopSharingHub |
| 9 | C:\Users\test\AppData\Local\Google\Chrome\UserData\FileTypePolicies |
| 10 | C:\Users\test\AppData\Local\Google\Chrome\UserData\Floc |
| 11 | C:\Users\test\AppData\Local\Google\Chrome\UserData\GrShaderCache |
| 12 | C:\Users\test\AppData\Local\Google\Chrome\UserData\GuestProfile |
| 13 | C:\Users\test\AppData\Local\Google\Chrome\UserData\hyphen-data |
| 14 | C:\Users\test\AppData\Local\Google\Chrome\UserData\MEIPreload |
| 15 | C:\Users\test\AppData\Local\Google\Chrome\UserData\Notification Resources |
| 16 | C:\Users\test\AppData\Local\Google\Chrome\UserData\OnDeviceHeadSuggestModel |
| 17 | C:\Users\test\AppData\Local\Google\Chrome\UserData\OptGuidePredictionModels |
| 18 | C:\Users\test\AppData\Local\Google\Chrome\UserData\OptHints |
| 19 | C:\Users\test\AppData\Local\Google\Chrome\UserData\OriginTrials |
| 20 | C:\Users\test\AppData\Local\Google\Chrome\UserData\pnacl |
| 21 | C:\Users\test\AppData\Local\Google\Chrome\UserData\profile1 |
| 22 | C:\Users\test\AppData\Local\Google\Chrome\UserData\profile2 |
| 23 | C:\Users\test\AppData\Local\Google\Chrome\UserData\Recovery Improved |
| 24 | C:\Users\test\AppData\Local\Google\Chrome\UserData\Safe Browsing |
| 25 | C:\Users\test\AppData\Local\Google\Chrome\UserData\SafetyTips |
| 26 | C:\Users\test\AppData\Local\Google\Chrome\UserData\ShaderCache |
| 27 | C:\Users\test\AppData\Local\Google\Chrome\UserData\SSLErrorAssistant |
| 28 | C:\Users\test\AppData\Local\Google\Chrome\UserData\SubresourceFilter |
| 29 | C:\Users\test\AppData\Local\Google\Chrome\UserData\SwReporter |

named pieces, giving each piece a file name and location in memory. File systems typically allow files to be grouped in folders, also called directories, that can themselves include subfolders (subdirectories) with their own files and subfolders. The folder/subfolder relationship is analogous to parent/child, with the uppermost folder called the root.

The location of a file within a file system is specified as a string of characters called a "folder path" that specifies the folders and subfolders that contain the file. For example, the folder path for a text file Notes.txt stored on a disk drive designated with a drive letter "C" might be expressed as C:\Users\Test\Documents\Notes. In this example, the root folder C includes subfolders Users, Test, and Documents. Folder and file names are delineated using colon and backslash characters in this embodiment, but other characters and formats can be used.

Ransomware tends to modify many disparate files across a file system, among myriad directories and subdirectories, and this pattern of action can aid in ransomware detection. However, many genuine processes also modify disparate True-root-path detection unit 210 reviews the file paths associated with a given process to find one or more of "true root folders" for the process. True root folders contain all the files a process acts upon and tend to be at lower levels in the file system hierarchy. In the example of Table 1, the folders "Google", "Chrome", and "UserData" are all specified by relatively low-level, subfolder paths and contain all the files chrome.exe is acting upon. True-root-path detection unit 210 narrows these down to identify the path to folder "Chrome" (C:\Users\test\AppData\Local\Google\Chrome) as the true root folder using an algorithm that distinguishes folder levels based on folder creation times. Genuine processes may have more than one true root folder, but the number will likely be low.

Ransomware processes tend to attack files across file hierarchies. Examining files acted upon by a ransomware thus yields a relatively large number of true root folders. True-root-path detection unit 210 counts the number of true root folders for each process under consideration and compares the number to a folder threshold. Processes that produce a number of true root folders above the threshold are flagged as ransomware or potential ransomware. In one embodiment, the true root folder threshold is three.

The following is an exemplary algorithm true-root-path detection unit 210 deploys to find the true root folder(s) for a given process. Other embodiments can work differently.

Algorithm:

```
find(true__root__of__a__file (file__or__folder__to__check))
{
Get file__or__folder__to__check
Get parent__folder(file__or__folder__to__check)
Get parent__folder(parent__folder(file__or__folder__to__check))
Get folder__creation__time(parent__folder(file__or__folder__to__check))
Get folder__creation__time(parent__folder(parent__folder(file__or__folder__to__check)))
Diff ← folder__creation__time(parent__folder(file__or__folder__to__check)) -
folder__creation__time(parent__folder(parent__folder(file__or__folder__to__check)))
if Diff >= Level__threshold then
  {
  true__root__of__a__file(file__or__folder__to__check) ←
  parent__folder(file__or__folder__to__check)
  Return true__root__of__a__file(file__or__folder__to__check)
  }
  else
  {
  file__or__folder__to__check←parent__folder(file__or__folder__to__check)
  Repeat find true__root__of__a__file (file__or__folder__to__check)
  }
  }
```

Sample Input Path:

C:\Users\test\AppData\Local\Google\Chrome\User\Data\RecoveryImproved\cache.txt

Sample Output Path (True Root Folder):

C:\Users\test\AppData\Local\Google\Chrome

True-root-path detection unit 210 finds the true root folder(s) for every file accessed by a process. The entire directory path is fed as input. The foregoing algorithm considers each folder's creation time, which is noted by the operating system at time of creation. Detection unit 210 fetches the creation times of folders at e.g. levels N and N−1 in a directory path folder using API calls and compares the times. If the time difference exceeds a level threshold, or time threshold, then folder level N is considered a stopping point. The path the folder at level N is returned as the true root folder. If the time difference does not exceed the level threshold, detection unit 210 continues along the directory path until the true root folder is found. Other embodiments use different path characteristics to detect ransomware.

Figure 3:
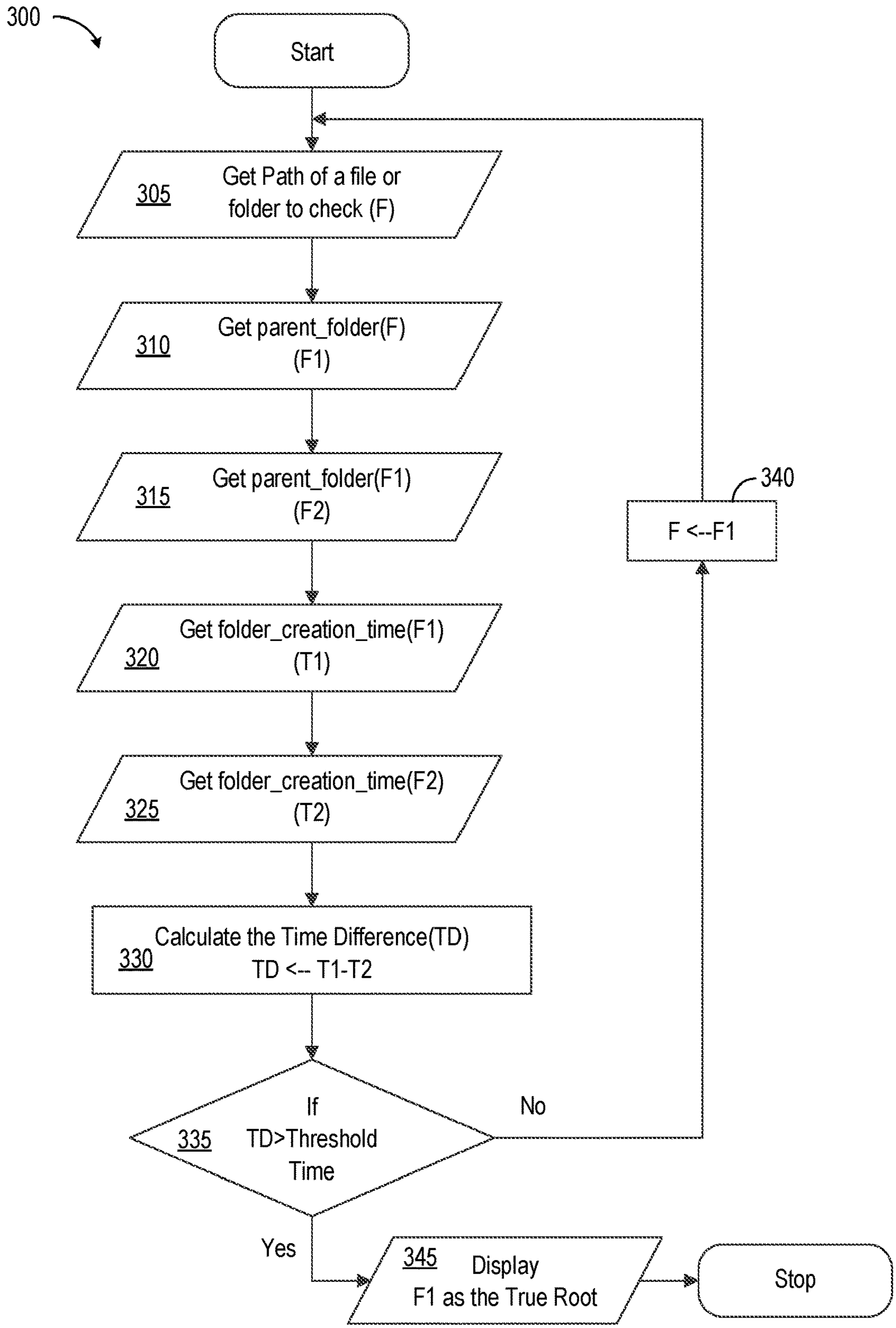
FIG. 3 is a flowchart 300 of a method of finding the true-root folder(s) for a process in accordance with one embodiment of detection unit 210.

FIG. 3 is a flowchart 300 of a method of finding the true root folder(s) for a single file in accordance with one embodiment of detection unit 210. The operating system supports system utilities that detection unit 210 calls upon to monitor real-time process/thread activity. The WINDOWS 10 operating system (Windows OS) from Microsoft, Inc., for example, provides kernel-level callbacks that can be used to monitor process creation and file changes to inform system 100 of an executing process. The operating system is then called upon to provide a list of files being acted upon by the process under consideration. Again using the example of WINDOWS 10, a process explorer or data collector (kernel driver) can provide process and file events to be used in creating the requisite list of files. The procedure of flowchart 300 starts and is repeated for each file of a process under consideration, providing a subfolder path for the file. Subfolder paths common to multiple files are consolidated into true-root paths, or folders.

In step 305, detection unit 210 gets the paths for a file F. Next, in steps 310 and 315, detection unit 210 gets the file's parent folders F1 and F2, the latter being the direct parent of the former. The folder creation times for folders F1 and F2 are read (steps 320 and 325) and the time difference calculated (step 330). Per decision 335, if the time difference falls below a level threshold, the folder level is incremented (step 340) and the loop repeats for the next level in the folder hierarchy of the file's path. If the time difference exceeds the threshold, detection unit 210 outputs the path associated with the parent folder as the subfolder path that is the true root folder for the file (step 345). The method is then complete for that file. The method is repeated for each file associated with the process under consideration.

Identical subfolder paths for different files from flowchart 300 are consolidated into one true-root path. In the example of Table 1, all files acted upon by chrome.exe share the same true-root path C:\Users\test\AppData\Local\Google\Chrome. The true-root-path count for process chrome.exe would thus be one. True-root-folder detection unit 210 compare the true-root-path count with a root-path threshold. If the number is greater than the root-path threshold, then files associated with the process under considerations are suspected of to be or to be infected by malware. Chrome.exe, having a count of just one, would not raise suspicion.

Files of suspect processes can be treated to additional inspection to avoid false positives. Recalling that ransomware threatens to encrypt the affected files, detection engine 130 can feed files associated with a suspect process to neural-network-based classifier 215, a linear neural-network model with five layers of neurons in this embodiment. Classifier 215 applies a machine-learning algorithm to classify each file as either encrypted or not encrypted. Encrypted files further suggest a ransomware threat. The sequence of events corresponding to the suspect file (such as "File_Delete", "File_Modified", "File_Rename") are put into high priority queue 135 for further consideration.

Returning to FIG. 1, events in high-priority queue 135 are passed to response engine 140, which is configured by the system administrator to perform one of three operations: 1) Detect, 2) Detect and kill, and 3) Detect, kill, and back-up recovery. Response engine 140 notifies server 110 about events posing ransomware threats and about the suitable configured response performed. Server 110 may store the events posing ransomware threats for future investigation.

A simple pattern for a ransomware process is to read and modify a file or files. This pattern is also exhibited by genuine processes. In the foregoing example, the process chrome.exe reads and modifies cookie and cache files for webpages visited by a user. Such actions can make a genuine application appear to be a ransomware threat, thereby increasing the false-positive rate. The increased false-positive rate poses a major challenge. Some embodiments deploy filters to further reduce false positives. These filters include:

1. Affected file discovered via Directory traversal
   1.1. API based directory traversal
   1.2. NTFS system-based traversal
2. Finding total number of unique process paths (e.g. unique "true root folders") for each process.
3. Applying secondary analysis to detect if a file in victim's endpoint has been encrypted, to conclude if a ransomware threat has been posed. This is performed using the neural network-based classifier.

Figure 4:
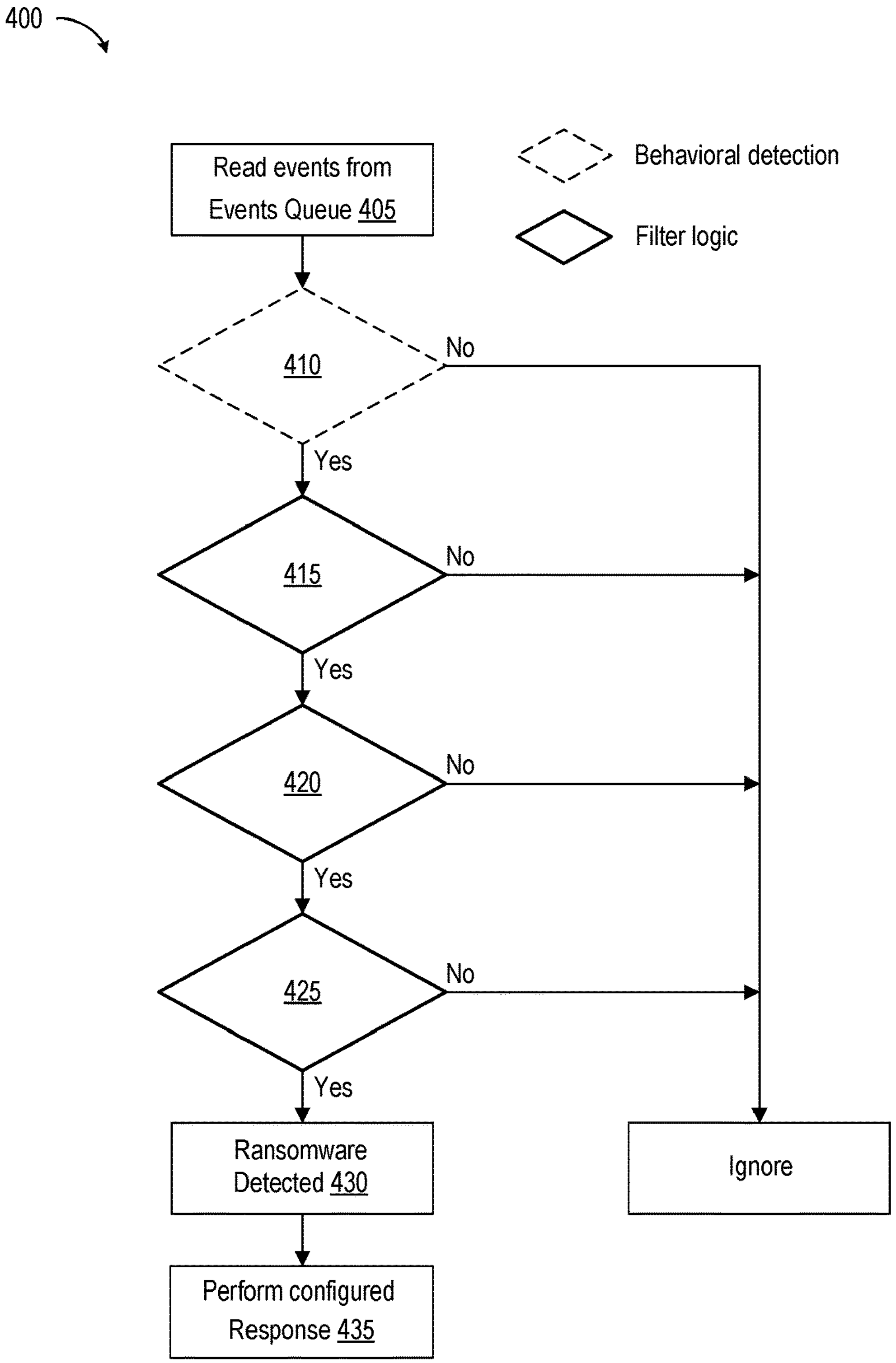
FIG. 4 is a flowchart 400 depicting a method of detecting ransomware in accordance with one embodiment of system 100 of FIG. 1.

FIG. 4 is a flowchart 400 depicting a method of detecting ransomware in accordance with one embodiment of system 100 of FIG. 1. Detection engine 130 receives event sequences from event reader 125 (step 405). Per decision 410, events and event sequences that are not associated with ransomware are ignored, while those consistent with ransomware behavior are passed to decision 415 where they are analyzed for signals of a path-traversal attack. If there are no such signs, the event or event sequence is ignored. If there are signs of a path-traversal, the process moves to decision 420 for further consideration.

Per decision 420, detection engine 130 ignores processes that yield fewer than some folder threshold (e.g. three) of true root folders, passing suspicious files to decision 425. A neural network is applied for decision 425 to detect whether a suspicious file is encrypted. If not, the event sequence is ignored. If so, then detection engine 130 signals ransomware detection (step 430) and performs some configured response to address the threat (step 435).

Ransomware often attempts to delete backup copies. Windows OS includes backup and recovery software called Volume Snapshot Service (VSS). System 100 periodically requests the VSS to save snapshots of files—shadow copies—including when the files are in use. The latest snapshots can be used to recover corrupted or lost files, helpful in the event of a ransomware attack. A major issue in relying on behavioral ransomware detection is that by the time a threat is detected, some of the user's files may have already been encrypted. One embodiment protects backup storage using Component Object Model (COM) Application Programming Interface (API) hooking and a Kernel Input/Output Request Packet (IRP) filtering method that prevent ransomware from deleting shadow copies so that encrypted files can be recovered.

Figure 5:
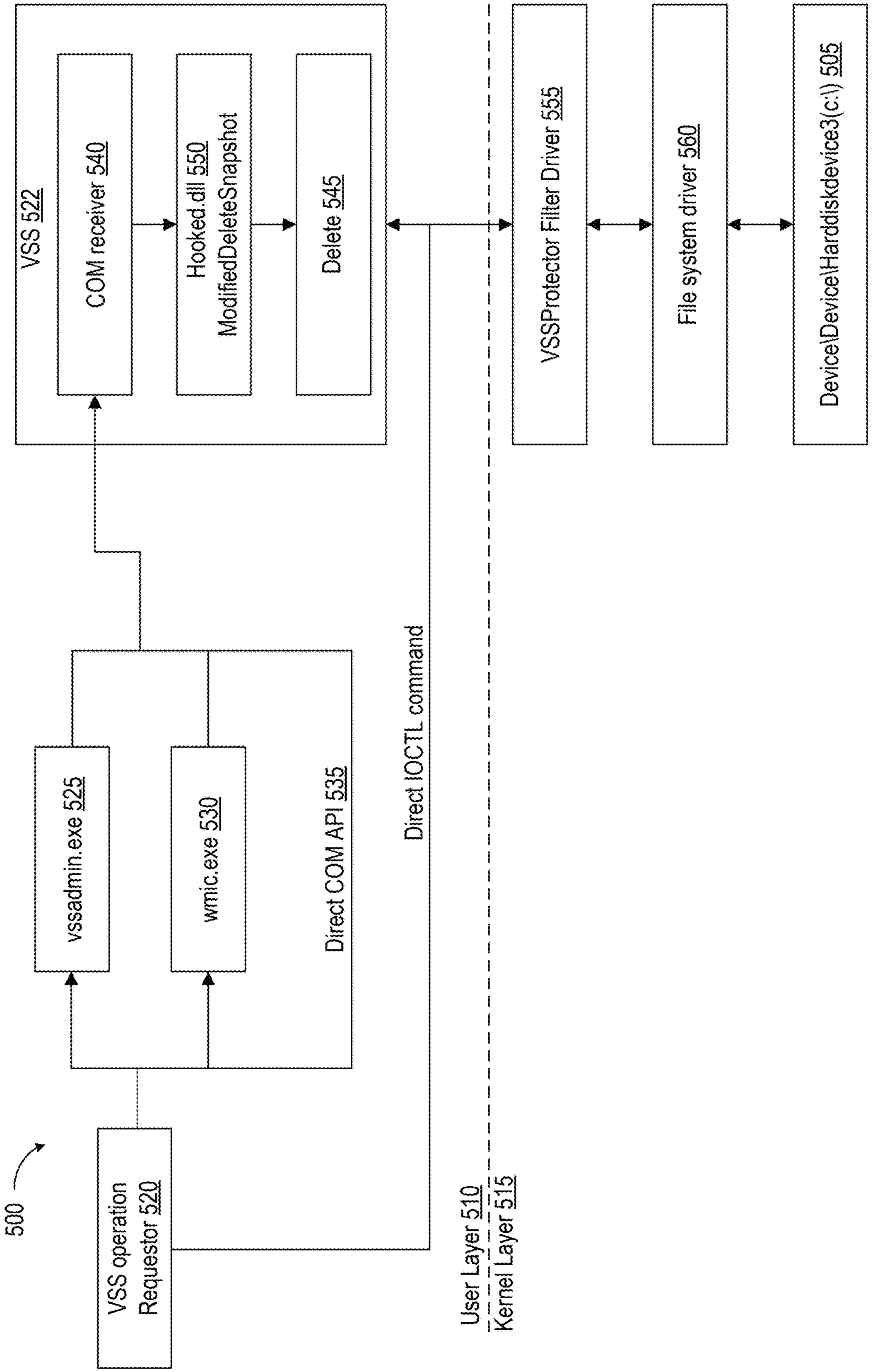
FIG. 5 depicts a ransomware-protection system 500 instantiated on a computer, a user endpoint that executes processes using one or more processors and memory to modify files and store them in secondary storage 505.

FIG. 5 depicts a ransomware-protection system 500 instantiated on a computer, a user endpoint that executes processes using one or more processors and memory to modify files and store them in secondary storage 505 (e.g. on a solid-state or hard-disk drive). Processes relevant to this discussion are shown diagrammatically. A user layer 510 shows processes that execute at the user level and a kernel layer 515 shows processes that execute within the operating system. All user software communicates with hardware, including secondary storage 505, via kernel layer 515.

User layer 510 includes a VSS operation requestor 520 that represents a volume-snapshot service tasked with saving shadow copies by invoking a system call to operating-system kernel 515 to access secondary storage 505. VSS operation requester 520 can issue shadow-copy deletion requests to a VSS 522 using e.g. command-line instructions via an administrative process vssadmin.exe 525, code or script via a utility process wmic.exe 530, or directly via the COM API 535.

Windows OS comes with a shadow-copy process vssvc.exe in place of VSS 522. Like VSS 522, process vssvc.exe includes a COM receiver 540 that can receive deletion requests and pass them to a shadow-copy-delete routine 545 that makes the call to kernel 515. VSS 522 is like shadow-copy process vssvc.exe but modified to include a hook 550 to intercept requests to delete shadow copies. COM receiver 540 implements a Windows interface called "COM API," which refers to the Component Object Model Application Programming Interface. Hook 550 augments the COM API by intercepting function calls or messages.

There are many API hooking methods available. In Windows, for example, a Dynamic Link Library (DLL) is injected into a VSS process from the kernel. During process creation, the injected DLL is loaded along with other DLLs. Since DLLs are injected from the kernel, it is difficult to control the DLL load order. When two DLLs are injected, for example, the first one can be injected into a VSS process, which hooks NtQuerySystemInformation API, which in turn loads the second DLL, which hooks the DeleteSnapshots COM API. DeleteSnapshots COM API address is calculated using vssvc.pdb. To hook a non-exposed API, the address at which the API resides is calculated using the pdb file and that address is used for hooking.

Kernel 515 includes a filter driver 555 that prevents shadow-copy delete or modification requests that bypass VSS 522, e.g. using a direct drive access (IOCTL command) to a file-system driver 560, or via a shadow-storage resize. Filter driver 555 prevents deletion requests from reaching file system driver 560, a conventional component of the Windows OS, and thus foils efforts by ransomware to prevent recovery of encrypted or otherwise lost files.

Filter driver 555, in one embodiment, employs Kernel Input Output Request-Packet (IRP) filtering to protect shadow copies from deletion methods that bypass VSS 522, methods like direct-device access and shadow-storage resize. Filter driver 555 can load above or below a device driver to capture IOCTL control codes that are sent to a storage volume (e.g. secondary storage 505). Filter driver 555 can block delete requests from VSS 522 that would otherwise delete shadow copies. Hook 550 is nevertheless included so that VSS 522 maintains synchronization with kernel 515. VSS 522 can, for example, maintain a record of shadow copies in secondary storage 505. Hook 550 can alert VSS 522 that a request is to be ignored, leaving filter driver 555 to block the request. Alternatively, VSS 522 can itself block the request.

Variations of these embodiments, and variations in usage of these embodiments, including separate or combined embodiments in which features are used separately or in any combination, will be obvious to those of ordinary skill in the art. Therefore, the spirit and scope of the appended claims should not be limited to the foregoing description. In U.S. applications, only those claims specifically reciting "means for" or "step for" should be construed in the manner required under 35 U.S.C. § 112(f).

What is claimed is:

1. A computer-implemented method for protecting a computer system from ransomware, the computer system including a processor and memory to execute a shadow-copy process that invokes system calls to an operating-system kernel, the system calls to write shadow copies in the memory to secondary storage, the method comprising:

receiving, at the shadow-copy process, a first request to delete at least one of the shadow copies in the secondary storage, wherein the shadow-copy process includes a Component Object Model (COM) Application Programming Interface (API) hook to intercept the first request, and wherein the shadow-copy process blocks the first request;

receiving, at the operating-system kernel, a second request to delete at least one of the shadow copies in the secondary storage, wherein the operating-system kernel includes an Input/Output Request Packet (IRP) filter to disallow the second request directed from a user layer to the operating-system kernel; and blocking the first request and the second request.

2. The method of claim 1, wherein the kernel blocks the second request.

3. The method of claim 1, wherein at least one of the first request and the second request comprises at least one of a Volume Snapshot Service (VSS) shadow-copy delete request and an overwrite request.

4. The method of claim 1, wherein the shadow-copy process maintains a record of the shadow copies in secondary storage.

5. The method of claim 1, wherein the shadow-copy process comprises a hook to intercept the first request.

6. The method of claim 5, wherein the shadow-copy process passes the first request to a shadow-copy delete routine, the shadow-copy delete routine includes the hook to intercept the first request, and the hook maintains a record of the shadow copies written to secondary storage.

7. The method of claim 1, wherein the shadow-copy process comprises a snapshot service.

8. A computer system for preventing ransomware from deleting shadow copies, the system comprising:

a user layer executing user-level processes, the user-level processes including a snapshot service to save the shadow copies and ignore first shadow-copy-deletion requests to delete the shadow copies, wherein the snapshot service includes a Component Object Model (COM) Application Programming Interface (API) hook to block the first shadow-copy-deletion requests; and a kernel layer executing operating-system-level processes, the kernel layer including a filter to ignore second shadow-copy-deletion requests to delete the shadow copies, wherein the filter comprises an Input/Output Request Packet (IRP) filter to disallow the second shadow-copy-deletion requests directed from the user layer to the kernel layer.

9. The computer system of claim 8, the snapshot service including a hook to intercept the first shadow-copy-deletion requests.

10. The computer system of claim 9, wherein the hook is to ignore the intercepted first shadow-copy deletion requests.

11. The computer system of claim 10, wherein the hook is to maintain a record of the shadow copies saved in the kernel layer.

12. The computer system of claim 8, wherein the second shadow-copy-deletion requests bypass the snapshot service.

13. The computer system of claim 12, wherein the second shadow-copy-deletion requests comprise a direct-device-access command.

14. The method of claim 1, wherein the operating-system kernel includes a filter to ignore the second requests request.

15. The method of claim 1, wherein the first request is issued using at least one command-line instruction via an administrative process.

16. The method of claim 1, wherein the second request comprises a direct-device-access command.

* * * * *